United States Patent
Romano

(10) Patent No.: US 6,434,032 B1
(45) Date of Patent: Aug. 13, 2002

(54) POWER SUPPLY WITH PLUG-RECEIVING RECEPTACLES CARRIED ON BRACKET AFFIXED TO BATTERY CASING

(75) Inventor: James P. Romano, Syracuse, NY (US)

(73) Assignee: Philip D. Anderson, Syracuse, NY (US)

( * ) Notice: Subject to any disclaimer, the term of this patent is extended or adjusted under 35 U.S.C. 154(b) by 0 days.

(21) Appl. No.: 09/762,068
(22) PCT Filed: Sep. 3, 1998
(86) PCT No.: PCT/US98/18321
§ 371 (c)(1), (2), (4) Date: Jan. 30, 2001
(87) PCT Pub. No.: WO00/14821
PCT Pub. Date: Mar. 16, 2000
(51) Int. Cl.[7] ................................................. H02M 1/00
(52) U.S. Cl. ........................................ 363/146; 320/113
(58) Field of Search ........................... 363/146; 320/113

(56) References Cited

U.S. PATENT DOCUMENTS 4,109,193 A * 8/1978 Schultheis .................. 320/109
5,220,269 A * 6/1993 Chen et al. .................. 320/112
5,243,510 A * 9/1993 Cheney, II .................. 363/146
5,680,026 A * 10/1997 Lueschen ..................... 429/97

* cited by examiner

Primary Examiner—Adolf Deneke Berhane
(74) Attorney, Agent, or Firm—George R. McGuire; Hancock & Estabrook, LLP

(57) ABSTRACT

An L-shaped bracket is affixed to one side of a portable battery (40). One leg of the bracket extends outwardly from the side of the battery and carries a pair of receptacles (46 and 48), one for transmitting operating and/or recharging power to the external, DC powered device and the other for transmitting recharging power to the portable battery. A carrying case (10) of heavy fabric has a plurality of compartments for diverse articles. The battery, with bracket and receptacles is mounted, preferably permanently, in an internal compartment which must be opened in order to gain access to the receptacles for insertion and removal of plugs (64). The battery is positioned in a pocket having an upper edge flush with the leg of the bracket carrying the receptacles and an upper portion of the battery extends above the pocket.

20 Claims, 7 Drawing Sheets

POWER SUPPLY WITH PLUG-RECEIVING RECEPTACLES CARRIED ON BRACKET AFFIXED TO BATTERY CASING

TECHNICAL FIELD

The present invention relates to portable power supplies for providing power to DC-operated equipment, and more particularly to a versatile carrying pouch including a 12 volt battery with attached receptacles for supply of DC power to and from the battery.

BACKGROUND ART

The proliferation of portable electronic devices which operate on DC has led to the provision of likewise portable DC power supplies which may be used to-operate such equipment and/or to recharge the batteries thereof. Examples of such devices are laptop and notebook computers, cellular telephones, portable CD and audio tape players, and portable video equipment. Often one or more charging cords are provided with the purchase of such equipment to permit operation and/or recharging the batteries thereof from an AC outlet or from a car battery via the cigarette lighter receptacle.

OBJECTS OF INVENTION

It is a principal object of the present invention to provide a portable DC power supply having novel and improved structural features.

A further object is to provide a portable DC power system including a versatile carrying case having a compartment for a battery of convenient size with easily accessible receptacles for supply of power to and from the battery as well as compartments for other uses.

Another object is to provide a portable DC power system wherein receptacles for transmitting DC power both from and to a battery physically accessible only upon opening a compartment of a carrying case wherein the battery is mounted.

Other objects will in part be obvious and will in part appear hereinafter.

DISCLOSURE OF INVENTION

The present invention includes a commercially available storage battery of the lead-acid type in a plastic casing of box-like configuration. In the disclosed embodiment, the battery has a 12 volt output at 2.9 ampere-hours. An L-shaped bracket is affixed to one side of the battery casing with one leg of the bracket extending outwardly from that side. The outwardly extending leg has a pair of openings in which are respectively mounted a first receptacle corresponding in size and configuration to a standard automobile cigarette lighter receptacle, and a second receptacle sized and configured to accept a conventional charging connector.

The battery is mounted within, and preferably affixed to, an internal compartment of a carrying case of flexible fabric. Although the carrying case may take any of a wide variety of configurations, it preferably includes a plurality of zippered, or otherwise selectively closured, compartments one of which contains the internal compartment for the battery. Relative dimensions are such that a portion of the battery extends above the upper edge of the internal compartment wherein it is mounted and the outwardly extending leg of the bracket is substantially flush with the upper edge of the internal compartment, offering unobstructed access to the two receptacles while concealing all or most of the wires connecting the receptacles to one another and to the battery terminals. A fuse is placed in the positive lead from the lighter receptacle to the battery terminal and is positioned in a holder accessible on the side of the battery opposite the receptacles. A diode is positioned in the lead from the charging receptacle to the positive side of the battery.

Electrical leads with suitable connectors at opposite ends are preferably provided with the portable power supply and, when not in use, stored in one or more of the compartments of the carrying case. One such lead has a plug on one end matable with a cigarette lighter receptacle on one end and a connector matable with a charging receptacle on the other end. This lead may be used for supplying power either to or from the portable battery. That is, the plug may be inserted into the lighter receptacle of the portable power supply and the connector into the charging receptacle of the portable electronic equipment to provide operating and/or charging power to the latter; alternatively, the plug may be inserted into the lighter receptacle of a vehicle and the connector into the charging receptacle of the portable power supply to charge the battery thereof from the vehicle battery. A second such lead has on one end a connector matable with the charging receptacle of the portable power supply and on the other end an AC-DC converter with prongs for insertion into a standard AC outlet for charging the battery of the portable power supply. A third such lead may be provided, having plugs on both ends for respective insertion into the lighter receptacles of both the portable power supply and a vehicle for purposes of supplying DC power to a vehicle having a dead battery; although the power provided would probably not be sufficient to start the vehicle, it could operate the emergency flashers or other low-power electrical elements of the vehicle for a limited time.

The foregoing and other features of construction and operation of the invention will be more readily understood and fully appreciated from the following detailed disclosure, taken in conjunction with the accompanying drawings.

MODES FOR CARRYING OUT THE INVENTION

Figure 1:
FIGS. 1 and 2 are perspective views of the carrying case of the portable power supply of the present invention, with all external compartments in closed positions, as seen from front and rear sides, respectively.
Figure 2:
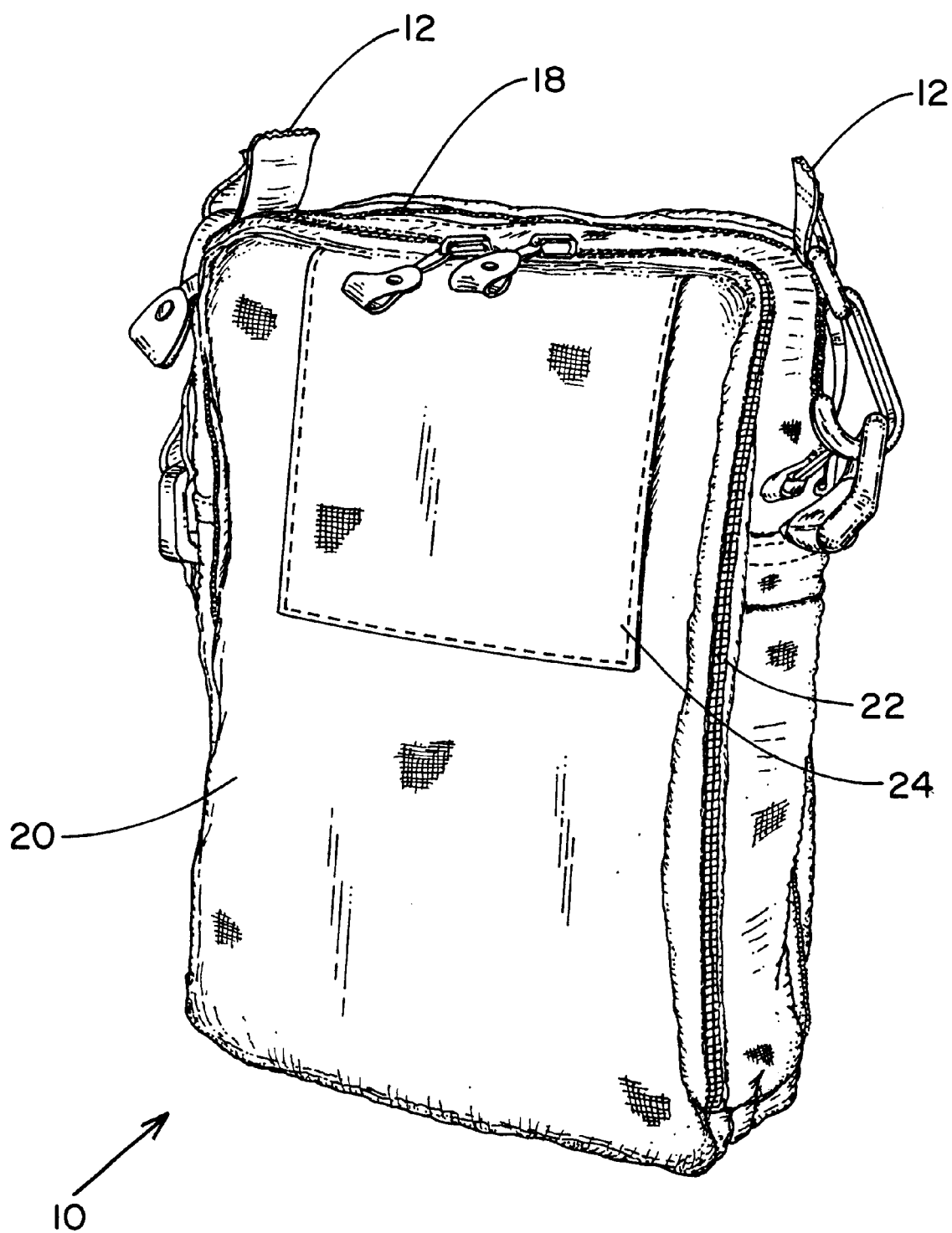
Figure 3:
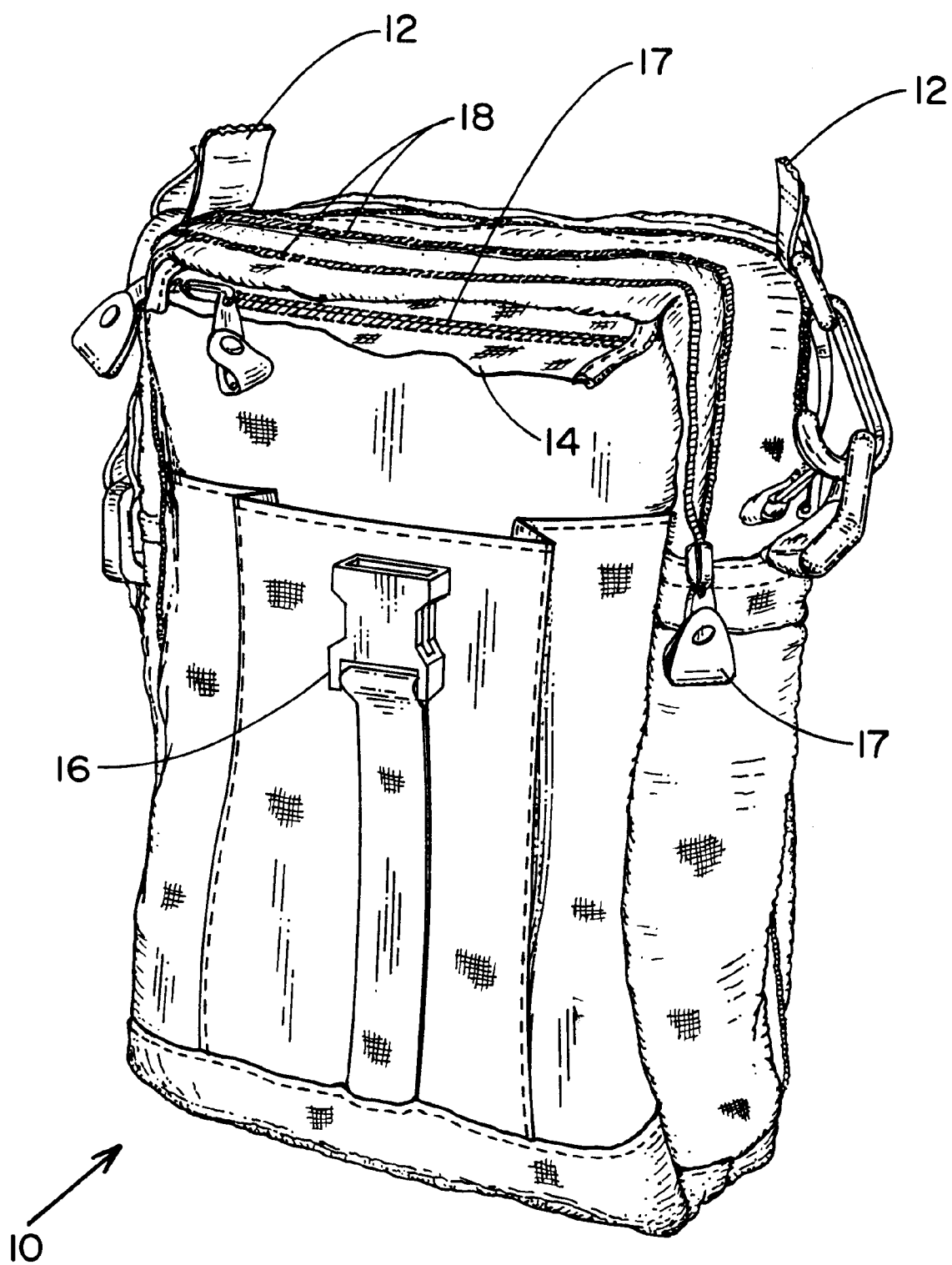
FIGS. 3 and 4 are perspective views of the carrying case from the front and rear sides, respectively with the external compartments in opened or partially opened positions, the upper portions of the battery, bracket and fuse holder being seen in FIG. 4 within an internal compartment.

The carrying case component of the portable power supply is indicated generally in FIGS. 1–4 by reference numeral 10. Case 10 is constructed of heavy-duty, flexible fabric and includes various zippered closures, clips, brackets, etc. Carrying strap 12, of adjustable length, is releasably connected to case 10. An external compartment in the nature of a pocket on the front side of case 10 is closed by flap 14 which is releasably secured by clip 16. Another compartment or pocket, fitted with zipper 17, is provided within flap 14. A further, externally accessible compartment on the front side is opened and closed by zipper 18. An externally accessible. compartment on the rear side is provided by flap 20 which is releasably secured to the body of case 10 by zipper 22. Fabric strip 24 is stitched along upper and lower sides to the outer surface of flap 20 and is open on both sides for passage of a belt or other waist carrying strap (not shown).

Figure 4:
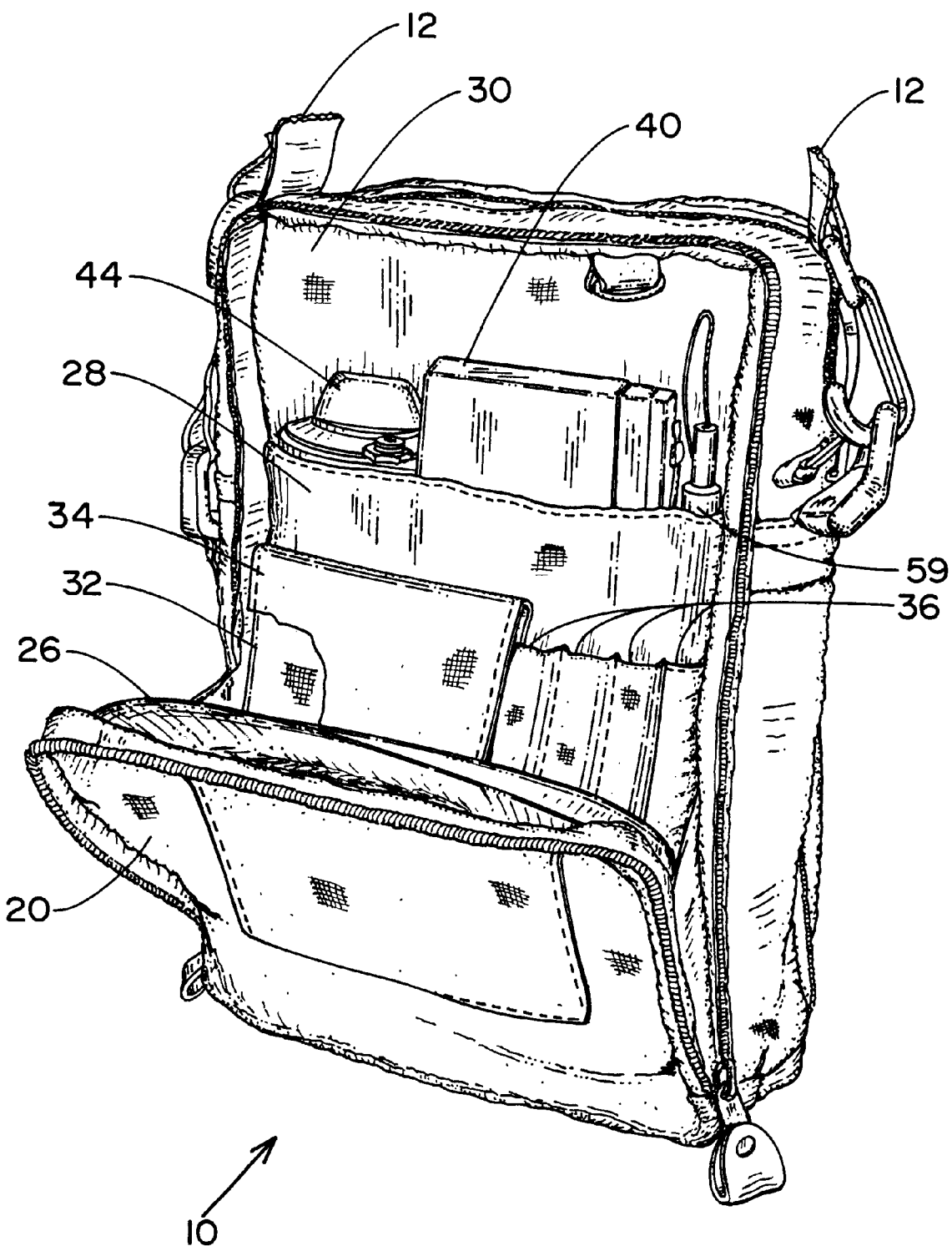

As seen in FIG. 4, opening of flap 20 provides access to a plurality of internal compartments including open-topped pockets 26 and 28 on the inner surface of flap 20 and on the facing surface of partition layer 30, respectively. Relatively small pocket 32, closable by Velcro-secured flap 34, and elongated compartments 36 for pens, pencils, etc. are provided on the outer surface of pocket 28. Although the number and location of the various compartments and pockets may be varied as desired, carrying case 10 preferably includes a plurality of both externally and internally accessible pockets for convenient storage and transport of not only electrical components of the portable power supply, but also many other items of diverse purposes. In any event, it is preferred that the battery itself, and components mounted thereon, be mounted in an internal compartment of case 10, accessible by opening a releasably secured external compartment.

Figure 5:
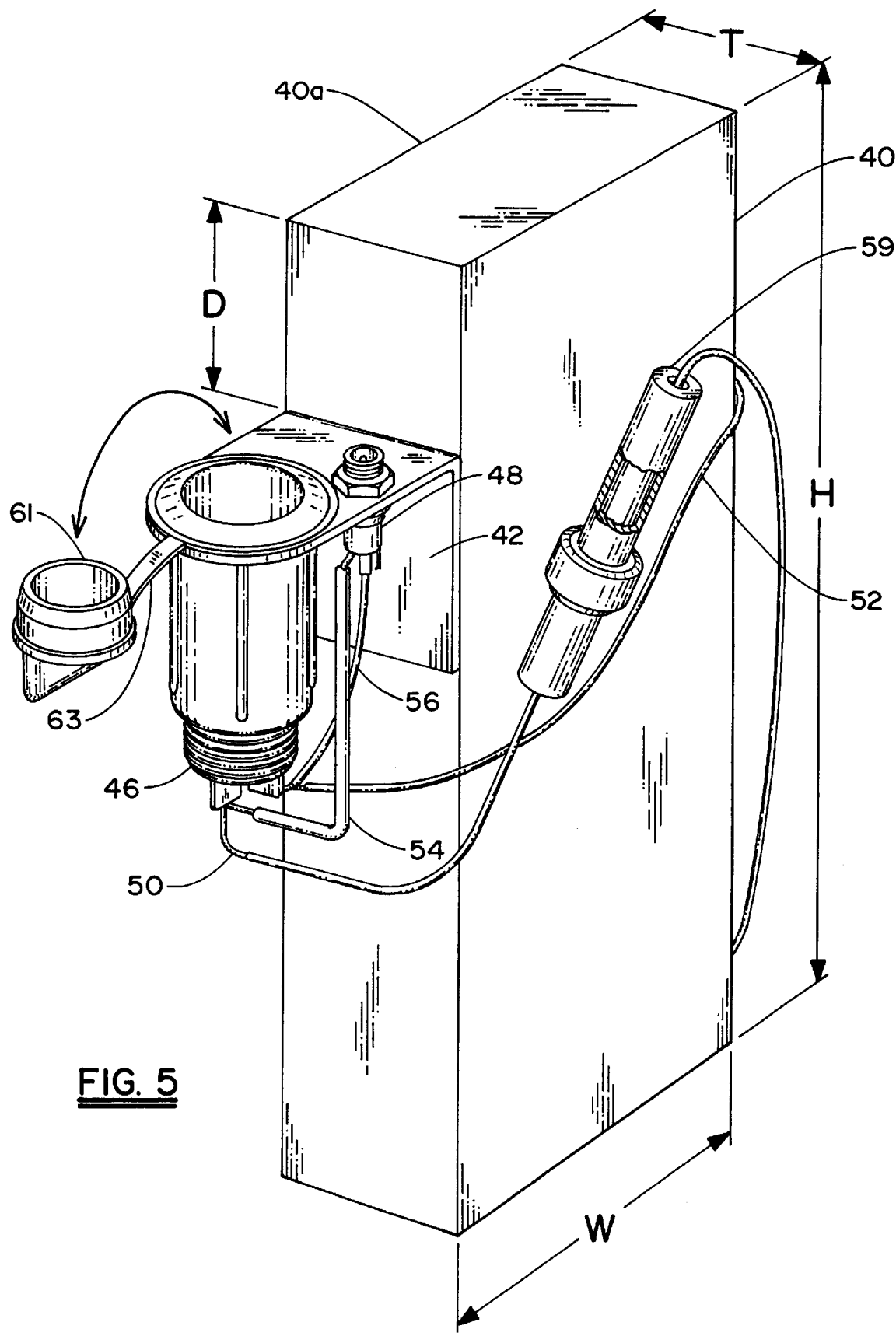
FIG. 5 is a perspective view of the battery and associated elements, removed from the carrying case.

Turning now to FIG. 5, the storage battery, denoted by reference numeral 40, of the portable power supply is illustrated separately from the carrying case. Battery 40 is of a commercially available type, contained within a six-sided, boxlike, plastic casing having external dimensions H. W and T on the order of 17.5 cm, 4.5 cm, and 3.3 cm, respectively. One leg 42 of a rigid, L-shaped bracket is securely attached to one of the side walls of battery 40 and the other leg 44 extends outwardly therefrom. A pair of receptacles 46 and 48 are mounted in registration with respective openings in leg 44. Receptacle 46 corresponds in construction and configuration to a standard vehicle cigarette lighter receptacle for receiving a compatible plug. Receptacle 48 is also of conventional design, sized to accept a standard power-transmitting connector. It will be noted that legs 42 and 44 have a width essentially equal to dimension T of battery 40, and the upper surface of leg 44 is spaced distance D from upper wall 40a of battery 40.

Figure 6:
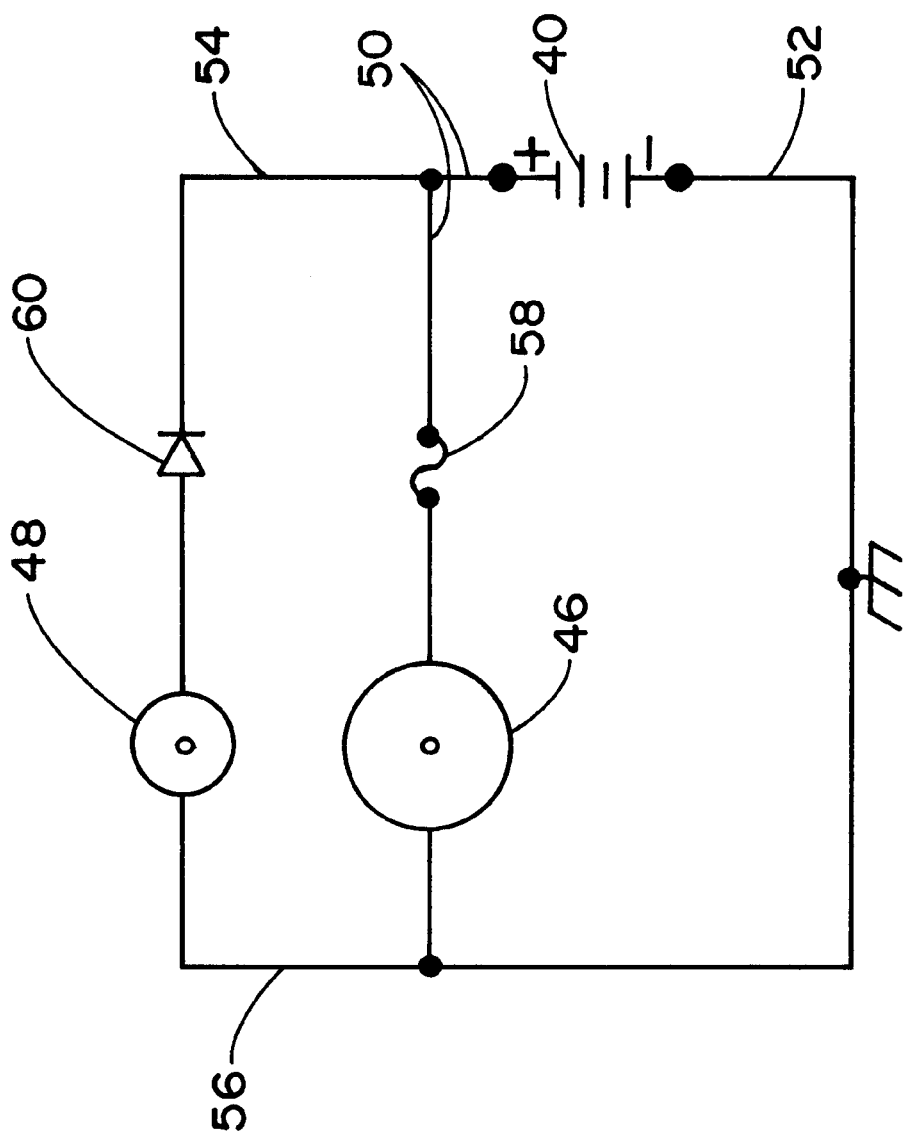
FIG. 6 is an electrical schematic of the circuitry of the portable power supply.

Positive and negative leads 50 and 52 are electrically connected at opposite ends to the positive and negative terminals, respectively, of each of receptacle 46 and battery 40. Leads 54 and 56 are electrically connected at opposite ends to corresponding terminals of receptacles 46 and 48. As seen in the schematic of FIG. 6, fuse 58 (e.g., 20 amp) is connected in positive lead 50, between receptacle 46 and the positive terminal of battery 40, and diode 60 is inserted in lead 54, between charging receptacle 48 and the positive terminal of the battery. The fuse is positioned in fuse holder 59, seen in FIGS. 4 and 5. Lead 54, or-at least the portion thereof including diode 60, is preferably enclosed by shrink wrap tubing. Plastic cap 61, connected to leg 44 of the bracket by flexible tether strap 63, is provided for frictional fit into the open end of receptacle 46 to prevent entry of foreign matter when the receptacle is not in use.

Referring again to FIG. 4, it will be seen that the lower portion of battery 40 is contained in pocket 28. Relative dimensions of the pocket and battery are such that the upper portion of the battery extends distance D above the upper edge of the pocket. Thus, the upper surface of leg 44 is substantially flush with the upper edge of pocket 28. The width of the pocket is sufficient to accommodate battery 40 and bracket leg 44 with space on the side opposite the leg to receive fuse holder 59. It will be understood that lead 50 is of sufficient length to permit fuse holder 59 to be withdrawn from pocket 28 for replacement of fuse 58.

Thus, with flap 20 open, the openings in leg 44 communicating with receptacles 46 and 48 are conveniently positioned for manual insertion and withdrawal of plugs and connectors. Essentially all of the wiring and terminals are contained and concealed within pocket 28. It is preferred that battery 40 and associated components, with the exception of fuse holder 58, be permanently (or at least semi-permanently) affixed to case 10, e.g., by a suitable adhesive securing the upper edge of pocket 28 to the opposing surface of the battery casing and the forward edge of the bracket, thereby reducing the possibility of damage to the components and electrical connections which may occur in removing and handling such components. Added protection is provided by permitting access to the receptacles only by opening an external compartment of the carrying case, i.e., by mounting all electrical components in an internal compartment.

Figure 7:
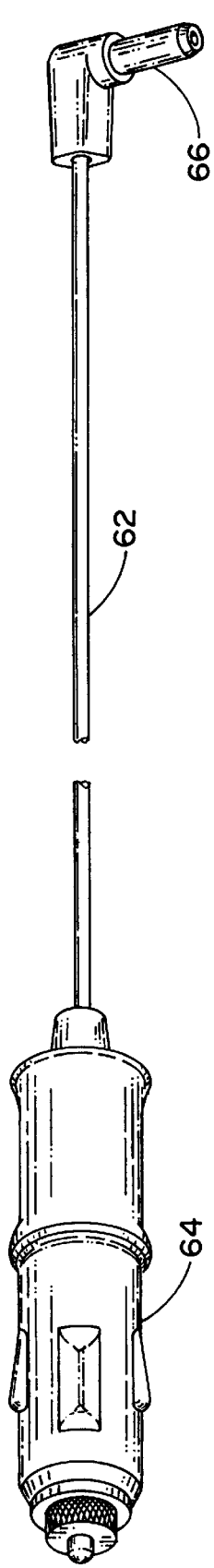
FIGS. 7, 8 and 9 are perspective views of three types of electrical leads for use with the portable power supply.
Figure 8:
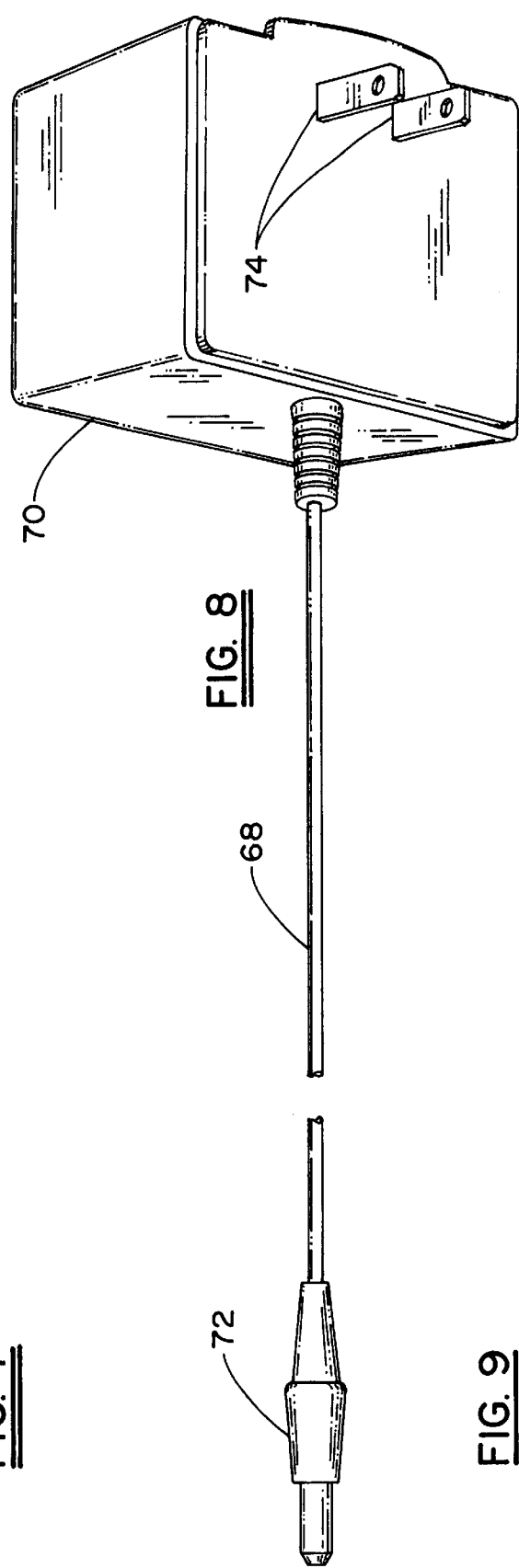
Figure 9:
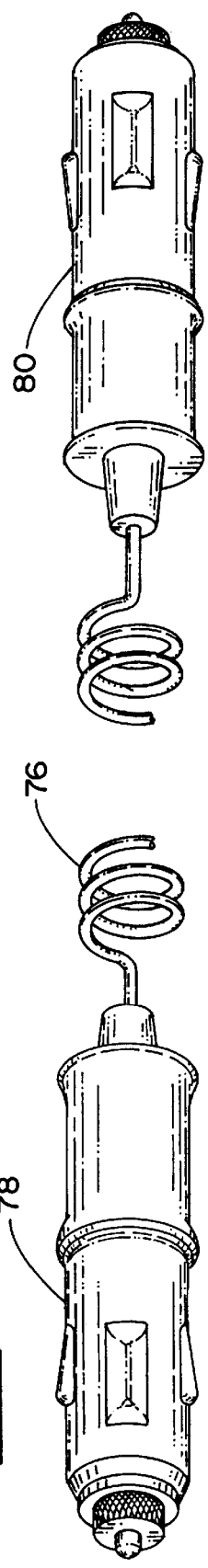

Referring now to FIGS. 7–9, electrical leads with various connector means on opposite ends, for use with, or as a part of, the portable power supply, are illustrated. Lead 62 has plug 64 and connector 66 mounted on opposite ends thereof. Plug 64 may be inserted in receptacle 46 and connector 66 inserted into the external power receptacle of an item of equipment powered by 12 volts DC to provide power from battery 40 to operate the equipment and/or to charge the battery or batteries which normally operate such equipment. Alternatively, plug 64 may be inserted into the cigarette lighter receptacle of a motor vehicle with a 12 volt battery, and connector 66 inserted into receptacle 48 to provide charging power from the vehicle battery to battery 40.

Lead 68 (FIG. 8) is connected at one end to AC-DC converter 70 and at the other end to connector 72. Prongs or blades 74 extend from converter 70 for insertion in a standard 110/115 volt AC wall outlet. Connector 72 is inserted in receptacle 48 to effect charging of battery 40 from the AC power of the outlet, which is converted to 12 volts DC by converter 70.

In FIG. 9, lead 76 is shown with plugs 78 and 80 connected to opposite ends thereof. Plugs 78 and 80 are identical, configured for mating engagement with receptacle 46 and the lighter receptacle of a motor vehicle, thereby providing power from battery 40 to the electrical system of the vehicle. Although, as previously mentioned, the power from battery 40 would not be sufficient to start the engine of a vehicle with a dead battery, situations could arise wherein provision of such power is useful, e.g., for operating the emergency flashing lights on the vehicle, or a cellular phone or radio normally powered by the vehicle battery.

From the foregoing, it will be understood that the present invention provides a convenient, low-cost, reliable and efficient power source with unlimited portability for operating equipment with a 12 volt power input. Such equipment is commonly provided with internally or externally mounted batteries and the power supply of the present invention may also be used to recharge such batteries. In fact, when the present power supply is connected to, e.g., a cellular telephone, it will simultaneously provide-operating power to the phone and charging power to the phone's battery. Furthermore, operating/recharging power may be provided to the external device even while battery 40 itself is receiving charging power. At the current state of battery technology, batteries provided for operation of typical laptop computers typically have a rating of 1 to 2 ampere-hours and will operate the computer for a maximum of perhaps one or two hours. The portable power supply of the present invention may use a low-cost, lead-acid battery well within present battery production technology having ratings of 2, 2.3 or 2.5 ampere-hours or greater to extend the operating life of the computer to 6 hours before its own batteries and that of the portable power supply are exhausted.

What is claimed is:

1. A portable DC power supply and associated carrying case having an electrical power output compatible with any of a plurality of electronic devices, each having a power inlet receptacle for connection thereto of one end of a power cord, said power supply and case comprising:
   a) a carrying case having at least one internal compartment and having closure mean alternatively positionable to permit and block user manual access to said internal compartment;
   b) a storage battery with a box-like configuration;
   c) a rigid bracket fixedly attached to said battery and having first and second, through openings;
   d) first and second electrical receptacles mounted upon said bracket in registration with said first and second openings, respectively;
   e) a plurality of fixed leads electrically connecting said receptacles with one another and with said battery; and
   f) means within said internal compartment for mounting said battery and bracket therein, whereby said receptacles are accessible for removable connection thereto of the other end of said power cord only when said closure means are positioned to permit access to said internal compartment.

2. The invention according to claim 1 wherein said carrying case is constructed of a flexible heavy fabric material.

3. The invention according to claim 2 wherein said carrying case includes a plurality of compartments.

4. The invention according to claim 1 wherein said battery is six-sided, having front, rear, two side and two end walls and is of predetermined height, width and thickness, said height being greater than either of said width and thickness.

5. The invention according to claim 4 wherein said bracket includes a first leg fixedly attached to said battery and a second leg, wherein said first and second openings are formed, extending outwardly from said battery.

6. The invention according to claim 5 wherein said one leg is attached to one of said side walls of the battery, and said second leg extends perpendicularly outwardly from one side wall.

7. The invention according to claim 6 wherein said carrying case has upper and lower ends, said closure means extending across said upper end, said battery is mounted in said internal compartment with one of said two battery end walls substantially adjacent said carrying case lower end, and said second leg extends outwardly from said one side wall at a predetermined distance D from the other of said battery end walls.

8. The invention according to claim 7 wherein said distance D is less than one-half said height of said battery.

9. The invention according to claim 8 wherein said means for mounting comprise a pocket closed at the bottom, adjacent said carrying case lower end, and at the sides, and having an upper edge separated substantially said distance D from said other of said battery end walls, whereby said second leg is substantially flush with said pocket upper edge.

10. The invention according to claim 9 wherein said battery and bracket are fixedly attached to said pocket at said upper edge.

11. A portable, rechargeable, DC power system for providing power to operate and/or recharge any of a plurality of devices having respective, built-in DC power supplies and a power inlet receptacle for connection of one end of a power cord from which said devices receive said operating and recharging power, said power system comprising:
   a) battery having a box-like casing with planar front and rear walls of predetermined height and width, two planar side walls of said predetermined height and a predetermined depth, planar top and bottom end walls of said predetermined width and depth, and positive and negative terminals;
   b) a rigid bracket having a first leg fixedly attached to one of said casing walls, and a second leg extending outwardly from said one wall and having a pair of through openings;
   c) a pair of receptacles mounted upon said second leg in respective registration with said pair of openings, each of said receptacles having a positive and a negative side;
   d) first and second electrical leads respectively connecting said positive and negative sides one of said receptacles to said positive and negative sides of the other of said receptacles; and
   e) third and fourth electrical leads connecting said positive and negative sides of said other receptacle to said positive and negative battery terminals.

12. The power system of claim 11 and further including a diode in said first electrical lead.

13. The power supply of claim 12 and further including a fuse in said third electrical lead.

14. The power supply of claim 13 wherein said other receptacle is of the vehicle cigarette lighter type.

15. The power supply of claim 14 wherein said one receptacle is configured to receive a conventional connector through which DC power is supplied to recharge said battery.

16. The power supply of claim 11 wherein said one wall is one of said two side walls of said battery, and said second leg extends substantially perpendicularly outwardly from said one side wall.

17. The power supply of claim 16 wherein said second leg has an upper surface parallel to and spaced a predetermined distance D from the plane of said top end wall, and both said first leg and said first and second receptacles extend from said second leg toward the plane of said bottom end wall.

18. The power supply of claim 17 wherein said distance D is less than one-half said predetermined height.

19. The power supply of claim 18 wherein said first and second legs have equal widths of substantially said predetermined depth.

20. The power supply of claim 19 wherein said positive and negative battery terminals are positioned on the other of said battery side walls.

* * * * *

UNITED STATES PATENT AND TRADEMARK OFFICE
CERTIFICATE OF CORRECTION

PATENT NO. : 6,434,032 B1
DATED : August 13, 2002
INVENTOR(S) : James P. Romano

It is certified that error appears in the above-identified patent and that said Letters Patent is hereby corrected as shown below:

Title page,
Item [73], change "Assignee: Philip D. Anderson" to -- Philip D. Anderson, d.b.a. The Anderson Group --.

Column 5,
Line 16, change "mean" to -- means --.

Column 6,
Line 1, after "separated" insert -- by --.

Signed and Sealed this

Twenty-first Day of January, 2003

JAMES E. ROGAN
*Director of the United States Patent and Trademark Office*